UNITED STATES PATENT OFFICE.

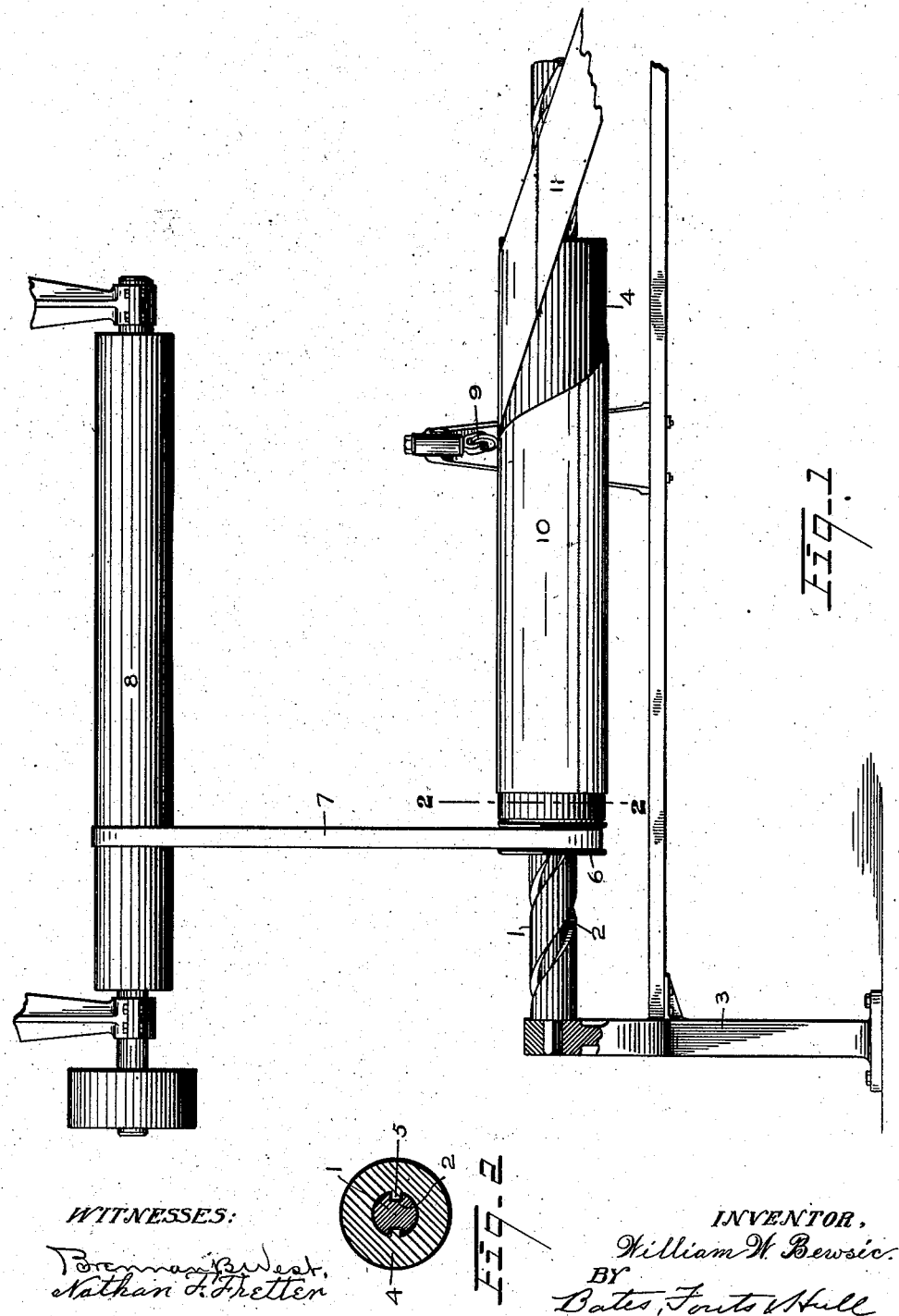

WILLIAM W. BEWSIC, OF NEWARK, NEW JERSEY.

PROCESS OF PRODUCING BIAS GOODS.

No. 893,300.　　　　Specification of Letters Patent.　　　Patented July 14, 1908.

Application filed November 23, 1906. Serial No. 344,684.

*To all whom it may concern:*

Be it known that I, WILLIAM W. BEWSIC, a citizen of the United States, residing at Newark, in the county of Essex and State of New Jersey, have invented a certain new and useful Improvement in Processes of Producing Bias Goods, of which the following is a full, clear, and exact description, reference being had to the accompanying drawings.

My invention relates to the production of bias goods, such as in binding, tape and the like, and has for its object to furnish a process for producing such goods whereby a great saving of time and labor may be accomplished with little or no waste of material.

The invention further contemplates the accomplishment of the above results with the production of a strip of any desired length that shall be free from seams.

Prior to my invention, the ordinary if not universal, manner for producing bias goods, whether for binding or other purposes, was to fold the cloth back and forth into a number of thicknesses, cut across the width of the goods, at the desired angle (about 45 degrees) and afterwards sew together the selvage edges of the separate pieces thus produced. In making the first and last cuts, a relatively large piece of material is lost from each thickness of the cloth. Furthermore, in cutting through the pile of folded material, it is practically impossible to make each piece in the pile of exactly the same width, and in sewing the selvage edges of the pieces together, the end of one piece will stretch more than the end of another. The result is that, when a sufficient number of pieces have been united to form the strip, the whole strip must be trimmed to uniform width, which width, of course, cannot exceed the width of the narrowest piece in the strip. To the loss of material produced by so trimming the strip must be added the loss which occurs in making the first and last cuts from the folded cloth or bolt. Aside from the loss of time which is necessary in order to trim the strip to uniform width, a further loss is incurred by the necessity of opening up each seam between adjacent pieces in the strip in order to iron the same flat.

It is the object of my invention to produce bias strips in any desired length with practically no loss of material and with a great saving in time and labor. To accomplish this, I form a bolt or other quantity of material from which the bias strip is to be produced into a tubular body, by securing the longitudinal selvage edges together or in juxtaposition to each other. These edges may be secured by sewing together in a long seam, which needs only to be opened up once for the application of the iron at one end, and the seam extending the whole length of the bolt or other piece of material may be quickly ironed flat. As a modification of this manner of forming the bolt or material into a tubular body, I may bring the longitudinal selvage edges into juxtaposition and unite the same by means of an adhesive strip, or, where it is desired to produce a seamless bias strip, the material may be woven into a tube. In cutting a bias strip from the body thus formed, a spiral cut is made around the tubular body, said cut being made at the desired oblique angle to the longitudinal axis of the body to produce a bias strip therefrom. A convenient manner of accomplishing this result is illustrated in the drawings, wherein Figure 1 represents an elevation, partly in section, of an apparatus for carrying out my process, and Fig. 2 represents a sectional view on the line 2—2 of Fig. 1.

Describing the parts by numerals, 1 represents an arbor having a spiral groove 2 formed therein, the pitch of said groove corresponding to the direction of the cut which it is proposed to make in the goods. This arbor is supported in a frame 3, and has mounted thereon a cylindrical drum 4, said drum being rotatably mounted upon the shaft and being provided with one or more lugs or projections 5 extending into the spiral groove whereby, on rotation of the drum, it is caused to move longitudinally of said shaft. The drum may be provided at one end with a flanged pulley 6 driven by a belt 7 mounted on a long pulley or drum 8 which may be driven from any suitable source of power. 9 represents a fixed cutter of any approved type mounted in operative relation to the drum 4. The tube 10 is mounted on the drum 4 and is temporarily secured thereon. The forward end of the drum 4, at the beginning of the operation, is under the knife 9 so that said knife can engage the end of the tube which is secured to the forward end of the drum. With this arrangement of parts, it will be apparent that, when the long pulley 8 is rotated, drum 4 will also be rotated, will travel along its shaft 1 and the knife 9 will cut therefrom a continuous bias strip 11. By using a suitable number of knives 9, appropriately spaced, a number of bias strips may be cut from the bolt 10 at the same operation. As the distance between adjacent knives may be fixed and as the pitch of groove 2 will be uniform, it will be apparent that any number of bias strips of uniform width and of practically any desired length may be produced from the tubular body mounted on the drum.

While, for the production of bias goods on a large scale, it is preferable to support the tubular body on a cylindrical drum, it is apparent that a continuous bias strip may be formed from the body, even though the same may not be mounted on such cylindrical drum. For instance, the strips may be cut by hand by merely marking on the goods with pencil the direction of the cut. By following this line, a large quantity of bias goods can be produced by an operator using a pair of shears or other cutter; or the body may be placed on a board which may be elliptical in section and, after having been marked in the manner described, the bias strip may be cut by means of a knife.

It will be apparent that, by employing a tube or body formed by weaving the goods together and cutting the same in the manner described, a bias strip may be produced having no seam whatever therein, the length of such strip depending merely upon the length of the tube which is formed from the material.

While, for convenience of description, I have referred to the body as a "tubular" body, I do not propose to be limited to cutting the goods from a body which is circular in cross section, and my process of producing the bias strip may be carried out by simply uniting or securing in juxtaposition the edges of the material from which the bias is to be cut and by cutting the same at the desired angle with respect to the axis of said body, notwithstanding the particular cross section which the body may possess during the cutting operation.

When the strips are cut from a tube which is produced by weaving the goods, it will be apparent that no seams will be formed in the strip cut therefrom, and the length of the seamless bias strip is limited only by the length of the tube. The production of a seamless strip not only accomplishes a great saving of time which has been heretofore expended in sewing together individual pieces and pressing out the seams between such pieces, but the freedom from such seams in the strip enables it to be conveniently manipulated in various sewing machine attachments.

I claim:—

1. The process of producing a bias strip for trimming, tape, binding and the like, which consists in forming into a tubular body the fabric from which the strip is to be cut, mounting the same upon a rigid support and making a continuous cut around the said tubular body at a constant angle with respect to the axis of the tube to produce a bias effect in the strip thus cut from the tube.

2. The process of producing a bias strip for trimmings, tape, binding and the like which consists in forming the textile fabric from which the strip is to be cut into a tube, mounting the same upon a rigid support, which support is adapted to rotate and move in a longitudinal direction, and by means of a suitable instrument making a continuous cut around said tube at a constant angle with respect to the axis of the tube to produce a bias effect in the strip thus cut from the tube.

In testimony whereof, I hereunto affix my signature in the presence of two witnesses.

WILLIAM W. BEWSIC. [L. S.]

Witnesses:
   IRVING L. WILD,
   EDWARD LEONARD.